Patented Aug. 2, 1932

1,869,768

UNITED STATES PATENT OFFICE

FRITZ NICOLAI, OF LUDWIGSHAFEN-ON-THE-RHINE, AND CURT SCHOENBURG AND GERHARD V. DER BRUCK, OF BITTERFELD, GERMANY, ASSIGNORS TO I. G. FARBENINDUSTRIE AKTIENGESELLSCHAFT, OF FRANKFORT-ON-THE-MAIN, GERMANY

PRODUCTION OF PHOSPHORIC ESTERS

No Drawing. Application filed November 11, 1929, Serial No. 406,509, and in Germany November 22, 1928.

The present invention relates to the production of phosphoric esters.

We have found that the neutral phosphoric acid esters of primary aliphatic alcohols are obtained in a very advantageous manner by mixing phosphorus oxychloride with a primary aliphatic alcohol at a temperature near zero C. and by then heating the mixtures to a temperature below that at which the main portion of the hydrochloric acid formed during the reaction is evolved.

Generally speaking, it is preferable in the process in accordance with the present invention to employ the alcohols in excess to the quantity theoretically required for a complete esterification of the phosphoric compound. The components are mixed at temperatures slightly above zero, or even below zero C. and the mixtures are then heated to from about 30° to 60° C., the period of time taken for the heating depending on the nature of the alcohol employed. The heating may be carried out at atmospheric pressure, or with the employment of reduced pressure. Practically no hydrochloric acid is evolved when heating at atmospheric pressure, while when heating with the employment of reduced pressure a partial removal of the hydrochloric acid is effected, from 40 to 50 per cent of the quantity present being usually removed.

Generally speaking, the working up of the reaction mixtures is preferably carried out by removing the hydrochloric acid, and in some cases the mono- or di-alkyl phosphoric acid esters which may be formed by washing with water, to which if necessary a little of an alkaline agent has been added, and by then subjecting the remaining product to fractional distillation. The reaction product may also be directly subjected to fractional distillation. The distillation is advantageously carried out under reduced pressure.

When it is desired to obtain neutral mixed esters of phosphoric acid, this may be effected for example by converting phophorus oxychloride in the manner already described with a quantity of an alcohol insufficient to form the neutral ester, by then adding the quantity of the other alcohol necessary for the formation of the neutral ester, or preferably a quantity in excess thereof, in the cold, and by then heating again in the manner already described.

By the process in accordance with the present invention, mixed aliphatic-aromatic esters or aromatic esters of phosphoric acid may also be obtained, either by first converting 1 or 2 molecular proportions of a phenol with 1 molecular proportion of phosphorus oxychloride and then further treating the reaction product with a primary aliphatic or aromatic alcohol, or by proceeding in the reverse order.

The following examples will further illustrate the nature of this invention, but the invention is not restricted to these examples. The parts are by weight.

Example 1

600 parts of butyl alcohol are cooled to about 4° C. by means of ice and then 153 parts of phosphorus oxychloride are slowly added during a period of 1 hour so that the temperature of the reaction liquid does not exceed 15° C. After all the phosphorus oxychloride has been introduced, the whole is heated for a period of about an hour at 40° C. in vacuo with the interposition of a receiver charged with alkali. A part of the hydrochloric acid formed is thus evolved, while the remainder remains in solution in the reaction liquid.

The reaction product is washed with water and alkali for the purpose of removing the hydrochloric acid and of recovering a small quantity of the acid ester of phosphoric acid which is also formed, and then the excess of alcohol and later the tributyl phosphate are distilled off in vacuo. The yield is practically quantitative.

Example 2

176 parts of iso-amyl alcohol are mixed at from 10° to 15° C. below zero with 153 parts of phosphorus oxychloride, whereupon the reaction mixture is heated for about half an hour to from 40° to 50° C. After cooling to from 10° to 20° C., 250 parts of butyl alcohol are added to the reaction mixture, and the mixture is heated again for about 30 minutes to 40° C. The neutral phosphoric ester is then recovered in the manner described in Example 1. According to analysis it constitutes the n-butyl di-iso-amyl phosphate with a boiling point of from 145° to 146° C. at about 4.5 millimetres (mercury gauge).

When the aforesaid 250 parts of butyl alcohol are replaced by from 300 to 400 parts of cyclohexanol, di-iso-amyl cyclohexyl phosphate with a boiling point of 142° C. at about 0.5 millimetre (mercury gauge) is obtained.

*Example 3*

211 parts of monophenyl phosphoric acid dichloride obtainable by allowing 153 parts of phosphorus oxychloride to run into 94 parts of phenol, are added to 400 parts of butyl alcohol, while stirring at from 0° to 5° C. The reaction mixture is then heated during half an hour to 40° C., and is kept at this temperature for another half an hour, while stirring. The product is then washed with a quantity of dilute aqueous sodium carbonate solution sufficient to remove the hydrochloric acid, and the small quantity of acid esters of phosphoric acid formed. The excess of butyl alcohol and, at a higher temperature, the neutral phosphoric acid ester are then distilled off in vacuo. The monophenyl dibutyl phosphate thus obtained in a yield of over 90 per cent of the theoretical yield with reference to the amount of phosphoric compound employed is a water-white liquid having a boiling point of from 183° to 185° C. at about 15 millimetres mercury pressure.

What we claim is:—

1. The process for the production of neutral phosphoric esters of alcohols, which comprises mixing phosphorus oxychloride at a temperature between about 15° below zero C. and about 15° C. with a primary saturated aliphatic alcohol, heating the mixture to a temperature below that at which the main portion of the hydrochloric acid is evolved, and then removing the hydrochloric acid.

2. The process for the production of neutral phosphoric esters of alcohols, which comprises mixing phosphorous oxychloride at a temperature between about 15° below zero C. and about 15° C. with a primary saturated aliphatic alcohol, heating the mixture at a pressure below atmospheric pressure to a temperature below that at which the main portion of the hydrochloric acid is evolved, and then removing the hydrochloric acid.

3. The process for the production of neutral phosphoric esters of alcohols, which comprises mixing phosphorus oxychloride at a temperature between about 15° below zero C. and about 15° C. with a quantity of a primary saturated aliphatic alcohol in excess of that required for complete esterification, heating the mixture to a temperature below that at which the main portion of the hydrochloric acid is evolved, and then removing the hydrochloric acid.

4. The process for the production of neutral phosphoric esters of alcohols, which comprises mixing phosphorus oxychloride at a temperature between about 15° below zero C. and about 15° C. with a quantity of a primary saturated aliphatic alcohol insufficient for complete esterification, heating the mixture to a temperature below that at which the main portion of the hydrochloric acid is evolved, cooling, adding a quantity of a primary saturated aliphatic alcohol in excess of that required for complete esterification, heating the mixture to a temperature below that at which the main portion of the hydrochloric acid is evolved, and then removing the hydrochloric acid.

5. The process for the production of neutral phosphoric esters of primary aliphatic alcohols, which comprises mixing phosphorus oxychloride at a temperature between about 15° below zero C. and about 15° C. with a quantity of iso-amyl alcohol insufficient for complete esterification, heating the mixture to about 40° C., cooling, adding a quantity of cyclohexanol in excess of that required for complete esterification, heating the mixture to about 40° C., and then removing the hydrochloric acid.

6. As a new article of manufacture, di-iso-amyl cyclohexyl phosphate having a boiling point of 142° C. at about 0.5 millimetre (mercury gauge).

7. The process for the production of tributyl phosphate which comprises mixing phosphorus oxychloride at a temperature between 4° and 15° C. with a quantity of butyl alcohol in excess of that required for complete esterification, heating the mixture to about 40° C. in vacuo, removing the hydrochloric acid, the acid ester formed and the excess of alcohol, and then distilling the tributyl phosphate in vacuo.

8. The process for the production of monophenyl dibutyl phosphate which comprises mixing monophenyl phosphoric acid dichloride at a temperature of from 0° to 5° C. with a quantity of butyl alcohol in excess of that required for complete esterification, heating the mixture to about 40° C., removing the hydrochloric acid, the acid ester formed and the excess of alcohol, and then distilling the monophenyl dibutyl phosphate in vacuo.

In testimony whereof we have hereunto set our hands.

FRITZ NICOLAI.
CURT SCHOENBURG.
GERHARD v. DER BRUCK.